(12) United States Patent
McGuire et al.

(10) Patent No.: US 11,427,055 B2
(45) Date of Patent: Aug. 30, 2022

(54) COMPRESSIBLE LATCH BRACKET

(71) Applicant: Brose Schließsysteme GmbH & Co. Kommanditgesellschaft, Wuppertal, Wuppertal (DE)

(72) Inventors: Deon McGuire, Oxford, MI (US); Oliver Karges, Cologne (DE)

(73) Assignee: Brose Schließsysteme GmbH & Co. Kommanditgesellschaft, Wuppertal, Wuppertal (DE)

( * ) Notice: Subject to any disclaimer, the term of this patent is extended or adjusted under 35 U.S.C. 154(b) by 541 days.

(21) Appl. No.: 16/280,438

(22) Filed: Feb. 20, 2019

(65) Prior Publication Data

US 2020/0262274 A1   Aug. 20, 2020

(51) Int. Cl.
*B60J 5/04* (2006.01)
*E05B 79/04* (2014.01)

(52) U.S. Cl.
CPC ............. *B60J 5/0416* (2013.01); *E05B 79/04* (2013.01)

(58) Field of Classification Search
CPC ................................ B60J 5/0416; E05B 79/06
See application file for complete search history.

(56) References Cited

U.S. PATENT DOCUMENTS

| | | | | |
|---|---|---|---|---|
| 4,898,415 A * | 2/1990 | Satoh | ...................... | E05B 79/06 292/337 |
| 5,033,236 A * | 7/1991 | Szerdahelyi | ........... | B60J 5/0416 49/502 |
| 5,226,259 A * | 7/1993 | Yamagata | ............... | B60J 5/0416 49/352 |
| 5,752,346 A * | 5/1998 | Kritzler | .................. | B60J 5/0433 49/502 |
| 5,924,245 A * | 7/1999 | Manuel | .................. | B60J 5/0416 49/352 |
| 6,189,267 B1 * | 2/2001 | Staser | .................... | B60J 5/0416 49/503 |
| 7,793,464 B2 * | 9/2010 | Bucker | ................... | E05B 79/06 49/502 |
| 7,877,932 B2 * | 2/2011 | Kriese | ................... | E05F 11/483 49/352 |

(Continued)

FOREIGN PATENT DOCUMENTS

DE         10304203 A1    7/2004
DE     202009011302 U1    1/2011

(Continued)

OTHER PUBLICATIONS

European Office Action for European Application No. 20 158 629.4-015, dated May 25, 2021, 7 pages.

*Primary Examiner* — Catherine A Kelly
(74) *Attorney, Agent, or Firm* — Brooks Kushman, P.C.

(57) ABSTRACT

A multi-function bracket may include an elongated guide member that defines a slot that is configured to guide a window pane, a handle-chassis bracket extending from the elongated guide member, a slider including a first portion and a second portion, configured to receive a handle chassis, and a compressible member. The compressible member may be coupled to the second portion of the slider and have a compressed state and an uncompressed state. The slider may be configured to translate towards the handle chassis bracket when the compressible member changes from the uncompressed state to the compressed state.

15 Claims, 5 Drawing Sheets

(56) References Cited

U.S. PATENT DOCUMENTS

| | | | |
|---|---|---|---|
| 8,763,308 B2 | 7/2014 | Roy et al. | |
| 10,350,975 B2* | 7/2019 | Kiwus | B60J 5/0468 |
| 10,603,989 B2* | 3/2020 | Keller | E05B 79/04 |
| 10,967,714 B2* | 4/2021 | Walawender | B60J 5/0416 |
| 2016/0290006 A1 | 10/2016 | Keller | |
| 2017/0096053 A1* | 4/2017 | Faust | E05B 79/04 |
| 2019/0092145 A1 | 3/2019 | Walawender et al. | |
| 2020/0248488 A1* | 8/2020 | Muta | B60J 5/043 |

FOREIGN PATENT DOCUMENTS

| | | |
|---|---|---|
| EP | 3075585 A1 | 10/2016 |
| FR | 3052478 A1 | 12/2017 |

\* cited by examiner

_Fig-8_

_Fig-9_

COMPRESSIBLE LATCH BRACKET

TECHNICAL FIELD

The present disclosure relates to a multi-function bracket for use in a motor vehicle door.

BACKGROUND

Multi-function brackets may provide several functions for a vehicle door. The multi-function bracket may be fastened to the vehicle door of a motor vehicle and include retaining features for a motor vehicle lock, or a window guide for receiving the window pane. Alternatively, the window guide may also be a separate structure of the multi-function bracket to be connected to a carrier plate. The multi-function bracket may also include mounting features for supporting or carrying a handle chassis.

SUMMARY

According to one embodiment, a multi-function bracket for use in a motor vehicle door is provided. The multi-function bracket may include an elongated guide member that defines a slot that is configured to guide a window pane, a handle-chassis bracket extending from the elongated guide member, a slider including a first portion and a second portion, configured to receive a handle chassis, and a compressible member. The compressible member may be coupled to the second portion of the slider and have a compressed state and an uncompressed state. The slider may be configured to translate towards the handle chassis bracket when the compressible member changes from the uncompressed state to the compressed state.

According to another embodiment, a multi-function bracket configured to carry a handle chassis for use in a motor vehicle door is provided. The multi-function bracket may include an elongated guide member that defines a slot that is configured to guide a window pane, a handle-chassis bracket extending from the elongated guide member, and a slider. The slider may include a first portion and a second portion. The first portion is may be configured to receive a handle chassis and the second portion may define a mounting aperture configured to receive the handle chassis. The mounting aperture may include a projection that extends into the aperture. The projection may include a first portion extending in a first direction and a second portion extending in a second direction, different than the first direction.

According to yet another embodiment, a vehicle door is provided. The vehicle door may include a handle chassis, a window pane, and a multi-function bracket. The multi-function bracket may include an elongated guide member, a slider, and a compressible member. The guide member defines a slot configured to guide the window pane. The slider may include a first portion and a second portion. The first portion is may be configured to receive a handle chassis and the second portion may define a mounting aperture configured to receive the handle chassis. The mounting aperture may include a projection that extends into the aperture. The projection may include a first portion extending in a first direction and a second portion extending in a second direction, different than the first direction. The compressible member may be coupled to the second portion of the slider and have a compressed state and an uncompressed state. The slider may be configured to translate towards the handle chassis bracket when the compressible member changes from the uncompressed state to the compressed state and the handle chassis may be configured to move from a first side of the projection to a second side of the projection towards the handle chassis bracket.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
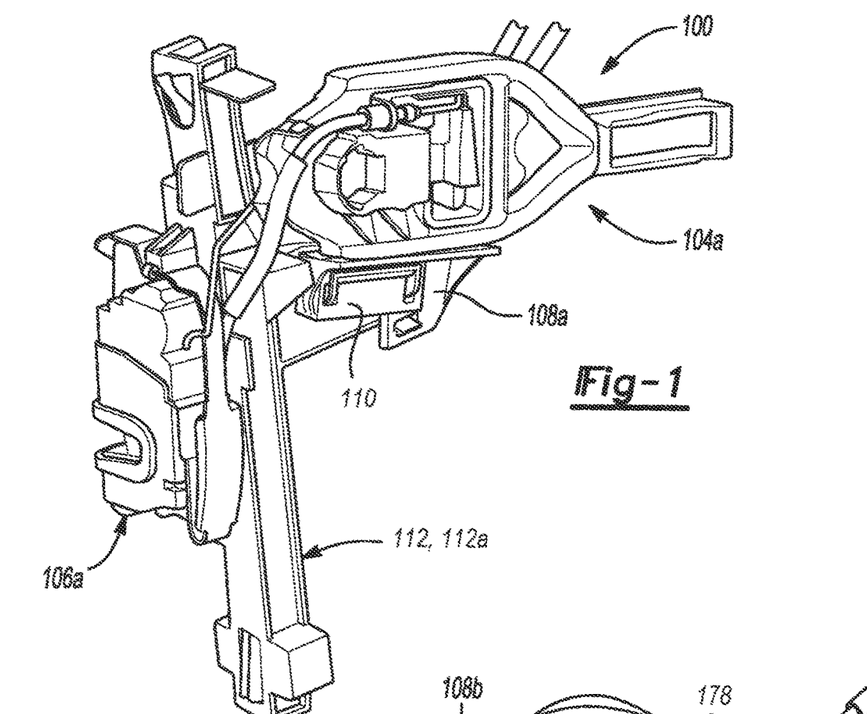
FIG. 1 is a perspective view of a multi-function bracket having a front-door handle chassis and a latch.
Figure 2:
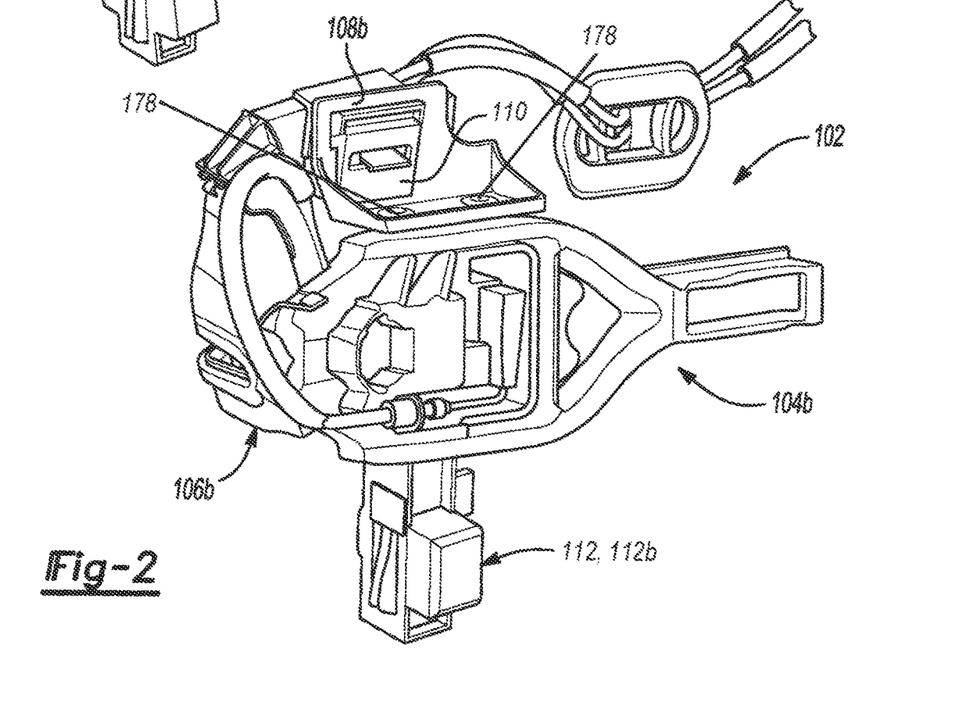
FIG. 2 is a perspective view of a multi-function bracket having a rear-door handle chassis and a latch.

FIG. 1 and FIG. 2 illustrate perspective views of a front-door latch-mini-module (LMM) assembly 100 and a rear-door LMM assembly 102, respectively. Each of the front-door and rear-door LMM assemblies include a multi-function bracket 112. The multi-function bracket 112 of the front-door LMM assembly 100 may carry a front-door handle chassis 104a and a front-door latch assembly 106a. The front-door handle chassis 104a may be supported by a slider 108a and a compressible member 110a. The multi-function bracket 112 of the rear-door LMM assembly 102 may carry a rear-door handle chassis 104b and a rear-door latch assembly 106b.

Figure 3:
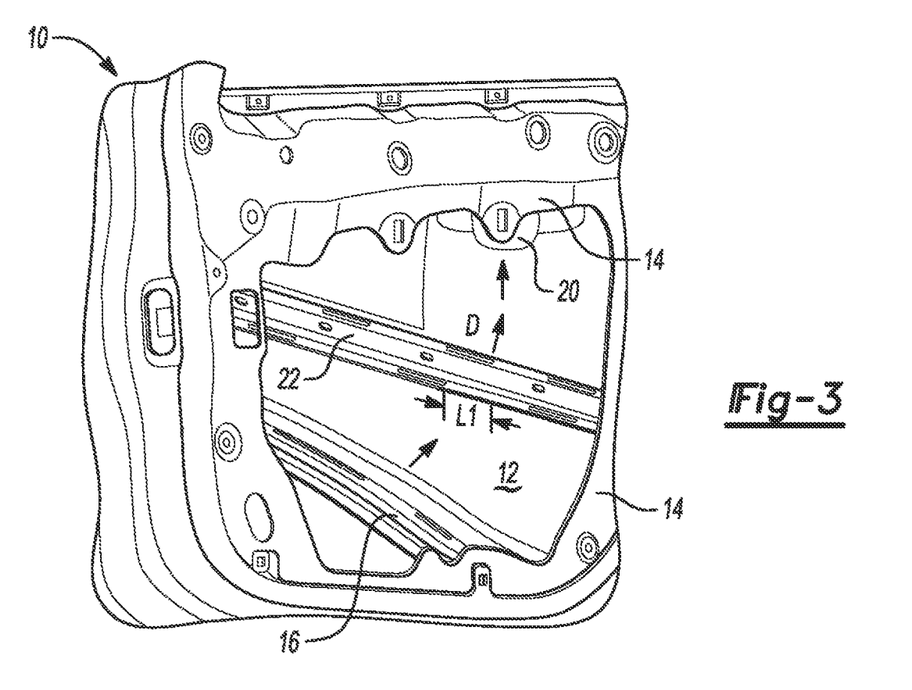
FIG. 3 is a perspective view of an interior portion of a door assembly.

FIG. 3 illustrates a perspective view of a vehicle door assembly 10. The vehicle door assembly 10 may include an outer panel 12 that is spaced apart from an inner panel 14. A first cross member 16 and a second cross member 22 may each extend across the vehicle door assembly. The second cross member 22 may be spaced apart from the outer panel 12 by a distance $L_1$. The outer door panel 12 may define a recessed handle pocket 20 that is configured to receive the front-door LMM assembly 100 or rear-door LMM assembly 102. To install the front-door LMM assembly 100 or rear-door LMM assembly 102, one of the assemblies 100, 102 must pass between the outer panel 12 and the second cross member 22, along the directional arrow D.

In one or more embodiments, the front-door LMM assembly 100 or rear-door LMM assembly 102 may have a width of approximately 140 mm. Whereas the narrowest opening defined by the door assembly 10 e.g., $L_1$, may have a width of 125 mm. The discrepancy between the opening of the door assembly and the front-door LMM assembly 100 or rear-door LMM assembly 102 may be problematic for installing the front-door LMM assembly 100 or rear-door LMM assembly 102 to the recessed handle pocket 20.

Figure 4:
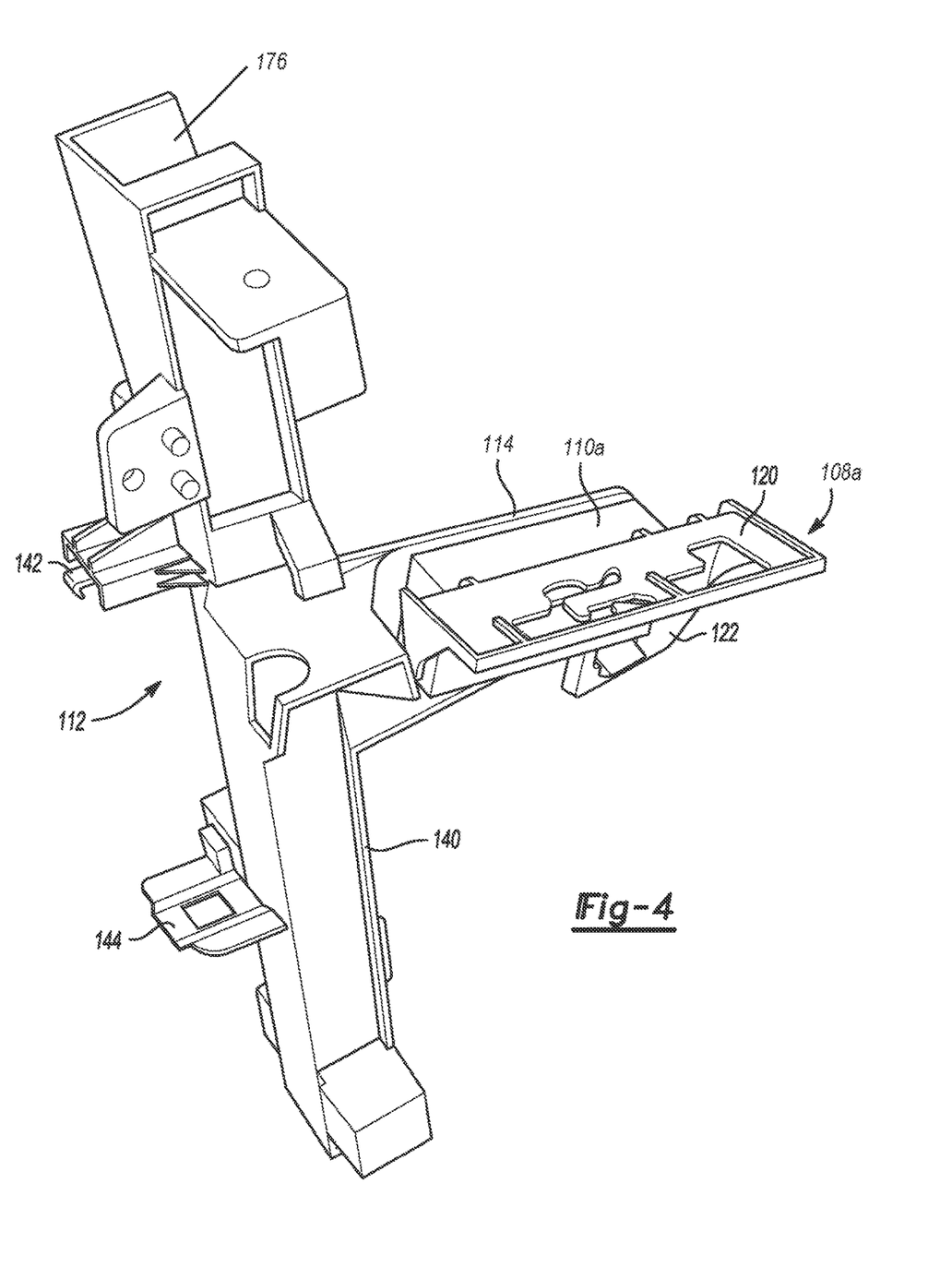
FIG. 4 is a perspective view of an exemplary multi-function bracket assembly.
Figure 5:
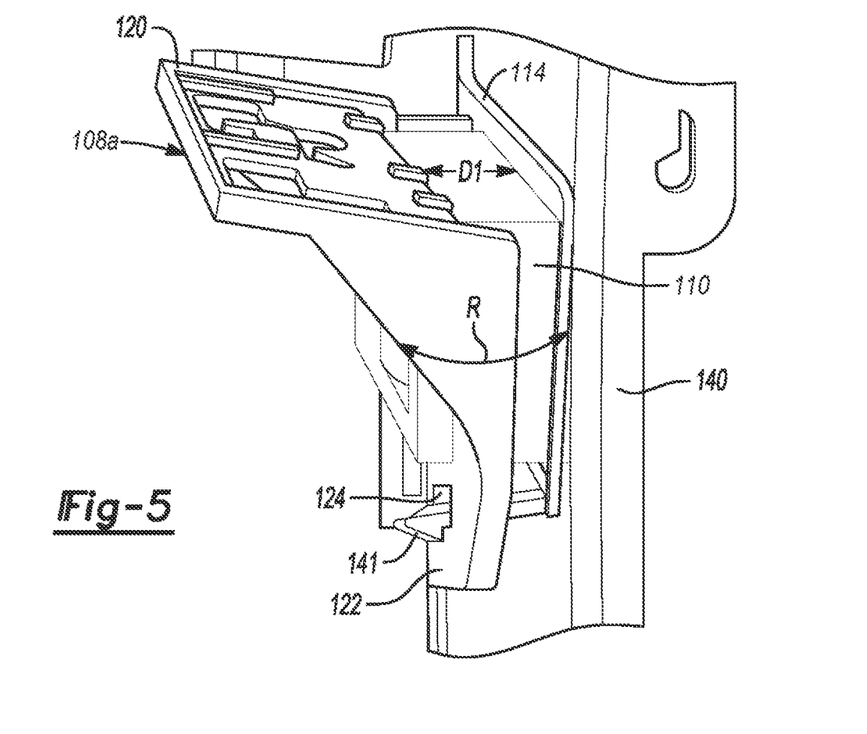
FIG. 5 is a partial perspective view of a portion of the exemplary multi-function bracket assembly of FIG. 4.

FIG. 4 and FIG. 5 each illustrate perspective views of an exemplary multi-function bracket assembly 112 according to one or more embodiments of this disclosure. Another example of a multi-function bracket assembly is described in U.S. Publication Number 2016/0290006 A1 and is hereby incorporated in its entirety herein. The multi-function bracket assembly 112 includes a guide member 140. The guide member 140 may include a channel that is configured to receive and guide a window pane (not illustrated). A latch receptacle configured to receive either a front-door latch 106a or a rear-door latch 106b may be comprise of an upper retaining member 142 and a lower retaining member 144.

A handle-chassis bracket 114 may extend from the guide member 140. In one or more embodiments, the handle-chassis bracket 114 may extend in a direction that is orthogonal to the guide member 140. A slider 108a and a compressible member 110 may be coupled to the handle chassis bracket 114. The slider 108a may include a first-slider portion 120 and a second-slider portion 122. The first-slider portion 120 of the slider 108a may be configured to carry or support the handle chassis 104a, 104b.

The compressible member 110 may have a compressed state and an uncompressed state. When the compressible member 110 changes from the uncompressed state to the compressed state the slider 108a may move along the directional arrow $D_1$ towards the handle chassis bracket 114. In one or more embodiments, force applied to a lower end of the compressible member may rotate the slider and a portion of the compressible member along the rotational arrow R. Changing the compressible member 110 from the uncompressed state to the compressed state may decrease the width of the front-door LMM assembly 100 and rear-door LMM assembly 102. The compressible member 110 may be formed of a foam such as a polyether foam.

In one embodiment, the compressible member may be one or more springs configured to change between a compressed and uncompressed state.

One or more protrusions may extend from the handle-chassis bracket 114. As on example, a protrusion, such as a retaining member 141 may extend through an aperture 124 defined by the second portion 122 of the slider 108a. The retaining member 141 may couple the handle-chassis bracket 114 to the slider 108a.

Figure 6:
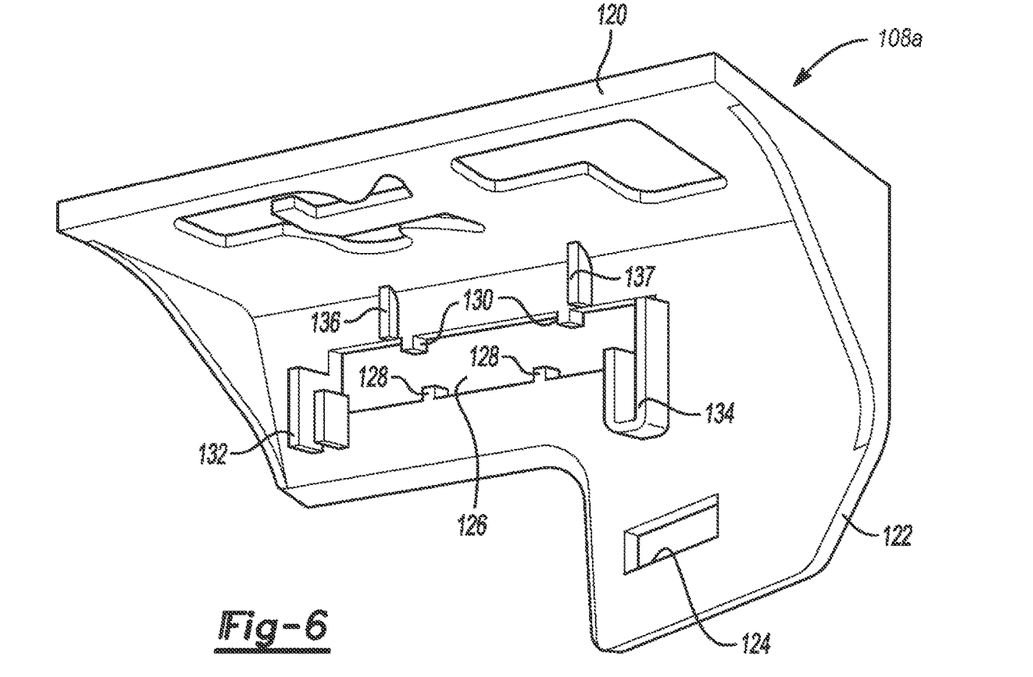
FIG. 6 is a perspective view of a portion of an exemplary slider.

FIG. 6 illustrates a perspective view of the slider 108a. The second portion 122 of the slider 108a may define an aperture 126 that may be sized to receive one or more protrusions extending from the handle chassis bracket 114. Projections such as protrusion engagement teeth 130, 128 may extend into the aperture and be configured to engage one or more protrusions extending from the handle chassis bracket. For example, a first set of tunable stops 136 and 137 may extend from the second portion of the slider and be configured to act as a stop for a mating component e.g., the handle chassis bracket 114. Also, a second set of tunable stops 132 and 134 may extend from the second portion of the slider and be configured to engage mating component e.g., the handle chassis bracket 114.

Figure 7:
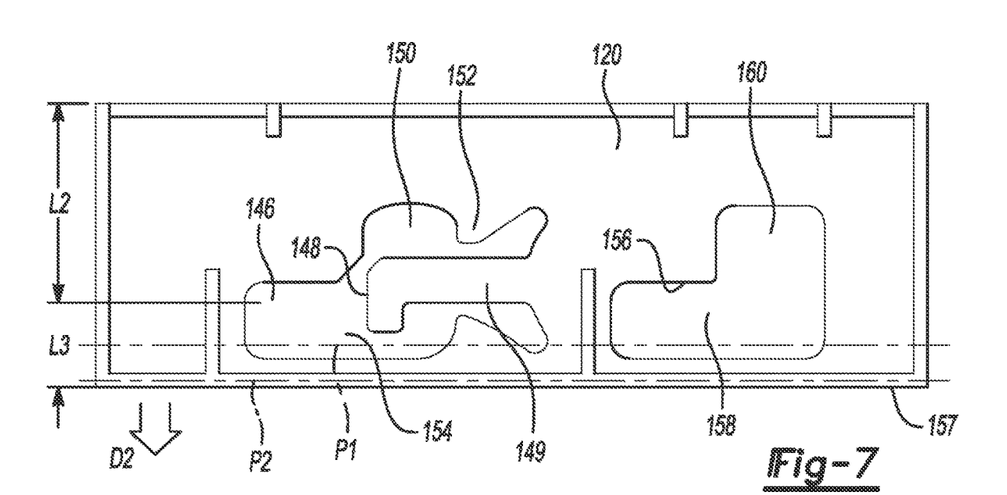
FIG. 7 is a top view of a portion the exemplary slider of FIG. 6.

FIG. 7 illustrates a top view of the first-slider portion 120 of the slider 118. The first-slider portion 120 of the slider 108a may define a first mounting aperture 146 and a second mounting aperture 158. The first mounting aperture 146 may define a first portion 150 and a second portion 154. The first portion 150 may be disposed closer to the second portion 122 of the slider 108a than the second portion 154. The second portion 154 may be disposed closer to a distal edge of the first-slider portion 120 of the slider 108a than the first portion 150 of the aperture 146. For example, the first portion 150 of the first mounting aperture 146 may be spaced apart from the second-slider portion 122 of the slider 108a by a distance $L_2$. And the second portion 154 of the first mounting aperture 146 may be spaced apart from the distal end 157 by a distance $L_3$. The first-slider portion 120 may include a projection that extends into the first aperture 146. In one or more embodiments, the projection may be L-shaped and include a first leg 149 and a second leg 148 that is positioned orthogonally the first leg 149.

The second mounting aperture 158 may be L-shaped and include a first portion 160 and a second portion 156. The front or rear handle chassis 104a, 104b may each be configured to move between the first portion 150 of the first mounting aperture 146 and the first portion 160 of the second mounting aperture 158 to the second portion 154 of the first mounting aperture 146 and the second portion 156 of the second mounting aperture 158. As an example, the front handle chassis 104a, the rear handle chassis 104b, or both may include one or more handle chassis protrusions 178 (FIG. 2) that may extend from the front and rear handle chassis 104a, 104b. Portions of the handle chassis protrusions may be inserted into the first portion 150 of the aperture 146 and the first portion 160 of the second mounting aperture 158. As the handle chassis 104a, 104b and handle chassis protrusions 178 are moved along the directional arrow D2, the first leg 149 and the second leg 148 may be configured to deform to permit movement of the one of the handle chassis protrusions 178 to the second portion 154 of the mounting aperture 146. Alternatively or additionally, the handle chassis protrusions 178 may include a head (FIG. 2) that may prevent the handle chassis protrusions from moving in a vertical direction to retain the handle chassis 104, 104b to the first-slider portion 120 of the slider 108a. Moving the handle chassis within the first and second portions of the first and second mounting apertures 146, 158 and along directional arrow $D_2$ may decrease the width of front-door LMM and rear-door LMM.

Figure 8:
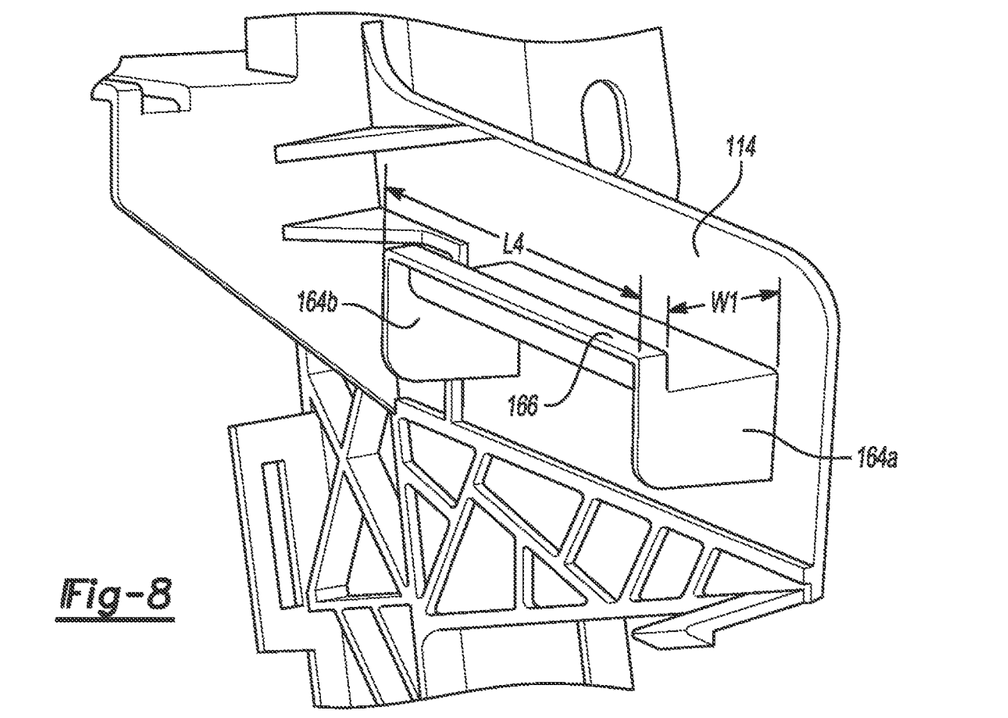
FIG. 8 is a partial perspective view of a portion of the exemplary multi-function bracket of FIG. 4.

FIG. 8 illustrates a perspective view of a portion of the multi-function bracket 112. The handle-chassis bracket 114 include one or more protrusions that may be configured to engage the slider 108a, or compressible member 110, or both. In one or more embodiments, the protrusion or protrusions may include a pair of support walls 164a and 164b that may outwardly extend from the handle-chassis bracket 114. The one or more of the support walls 164a and 164b may support a ledge 168 that may extend between the handle-chassis bracket 114 and a flange 166. The support walls may be spaced apart by a distance $L_4$. The flange 166 may be spaced apart from the handle-chassis bracket 114 by a first width $W_1$ and retain the slider 108a, or compressible member 110, or both. The slider 108a and the compressible member 110 may be sandwiched between the flange 166 and the handle-chassis bracket 114.

Figure 9:
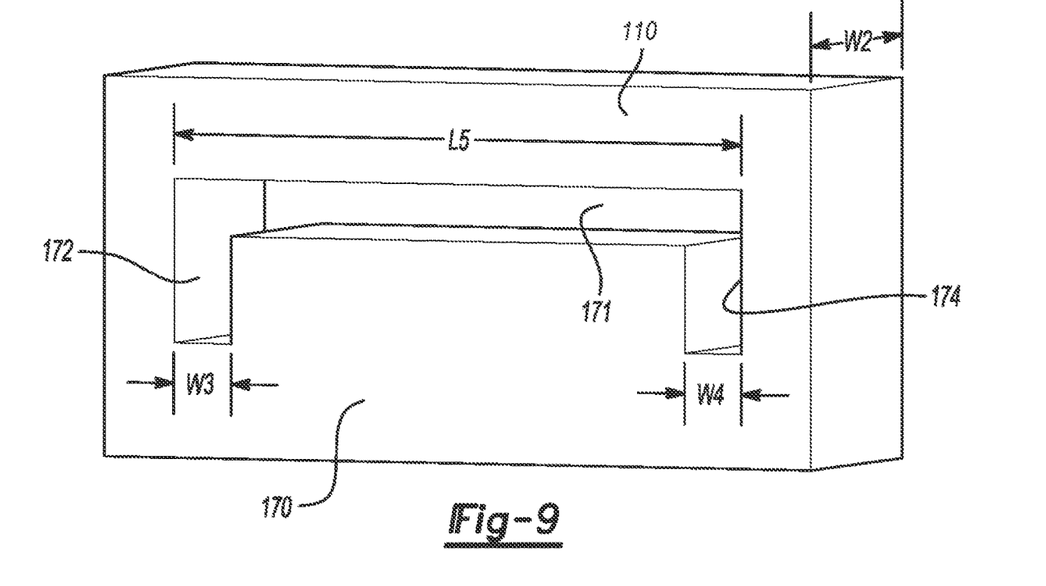
FIG. 9 is a perspective view of an exemplary compressible member.

FIG. 9 illustrates a perspective view of the compressible member 110. The compressible member 110 may have a rectangular cube shape that has a width of $W_2$. When the compressible member changes between the uncompressed state to the compressed state, the width $W_2$ may change accordingly. The compressible member 110 may define an aperture 171 and the aperture may be configured to receive one or more of the protrusions that extend from the handle-chassis bracket 114. In one or more embodiments, the aperture 171 may be U-shaped and include a first portion disposed between a second portion 172 and a third portion 174. The second portion 172 may have a width $W_3$ and the third portion 174 may have a width $W_4$.

The second portion 172 and the third portion 174 may each be sized to receive the first support wall 164a and the second support wall 164b. For example, the second and third portions 172 and 174 may be configured to engage the first support wall 164a and the second support wall 164b in an interference type fit. The aperture 171 may define a length L5 that may be sized to receive the protrusions, such as the ledge 166, of the handle-chassis bracket 114.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 vehicle door assembly
12 outer door panel
14 inner panel
16 first cross member
20 handle pocket
22 second cross member
100 front—door LMM assembly
102 rear—door LMM assembly
110 compressible member
112 multi—function bracket assembly
114 handle chassis bracket
120 first-slider portion
122 second-slider portion
124 aperture
126 aperture
128 protrusion engagement teeth
130 protrusion engagement teeth
132 tunable stops
136 tunable stops
140 guide member
141 retaining member
142 upper retaining member
144 retaining member
146 first mounting aperture
148 second leg
149 first leg
150 first portion
154 second portion
157 distal end
158 second mounting aperture
160 first portion
166 flange
168 ledge
171 aperture
172 second portion
174 third portion
178 handle chassis protrusion
104a front—door handle chassis
104b rear—door handle chassis
106a front—door latch assembly
106b rear—door latch assembly
108a slider
108b slider
164a first support wall
164b second support wall
176 slot
178 handle chassis bracket protrusions While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A multi-function bracket for use in a motor vehicle door comprising:
    an elongated guide member defining a slot configured to guide a window pane;
    a handle-chassis bracket extending from the elongated guide member;
    a slider including a first portion and a second portion wherein the first portion is configured to receive a handle chassis; and
    a compressible-foam member coupled to the second portion of the slider and having a compressed state and an uncompressed state, wherein the slider is configured to translate towards the handle chassis bracket when the compressible member changes from the uncompressed state to the compressed state to decrease a width of the multi-function bracket as the multi-function bracket is installed in the vehicle door.

2. The multi-function bracket of claim 1, wherein the compressible-foam member defines an aperture and wherein the aperture is configured to receive a protrusion that extends from the handle-chassis bracket.

3. The multi-function bracket of claim 2, wherein the protrusion defines a ledge, wherein the ledge is supported by a first support member and a second support member.

4. The multi-function of claim 3, wherein the ledge defines a retaining flange and wherein the retaining flange and a portion of the handle-chassis bracket is configured to receive the compressible-foam member.

5. The multi-function bracket of claim 3, wherein the aperture defined by the compressible-foam member includes an elongated portion, a first leg portion, and a second leg portion, and wherein the first leg portion and the second leg portion extend in a direction that is orthogonal to the first portion.

6. The multi-function bracket of claim 5, wherein the elongated portion of the aperture receives the ledge of the protrusion.

7. The multi-function bracket of claim 1, wherein the first portion of the slider defines a mounting aperture including a first portion and a second portion, wherein when the multi-function bracket and a handle chassis are assembled to one another in an installation state, the first portion of the aperture retains the handle chassis, and wherein when the multi-function bracket and the handle chassis are assembled to one another in an installed state, the second portion of the mounting aperture fixes the handle chassis to the slider.

8. A multi-function bracket configured to carry a handle chassis for use in a motor vehicle door comprising:
   an elongated guide member defining a slot configured to guide a window pane;
   a handle-chassis bracket extending from the elongated guide member; and
   a slider including a first portion and a second portion wherein the second portion is coupled to the handle-chassis bracket and the first portion defines a mounting aperture configured to receive the handle chassis and includes a projection extending into the aperture, wherein the projection includes a first-projection portion extending in a first direction and a second-projection portion extending in a second direction, substantially orthogonal to the first direction,
   wherein the first portion of the slider includes a distal edge and wherein the first-projection portion is spaced apart from the second portion of the slider by a first distance and wherein the first-projection portion is spaced apart from the distal edge by a second distance, less than the first,
   wherein the second portion of the slider defines a first aperture and a second aperture, the handle-chassis bracket includes a number of protrusions, wherein a first protrusion of the number of protrusions extends through the first aperture defined by the second portion of the slider,
   wherein the second portion of the slider includes a plurality of teeth extending into the second aperture and wherein the plurality of teeth are configured to engage a second protrusion of the number of protrusions.

9. The multi-function bracket of claim 8, further comprising a compressible-foam member having a compressed state and an uncompressed state, wherein the compressible-foam member is disposed between the handle chassis bracket and the second portion of the slider, and wherein the slider is configured to translate towards the handle chassis bracket when the compressible-foam member changes from the uncompressed state to the compressed state.

10. The multi-function bracket of claim 9, wherein the compressible-foam member is formed of polyether foam.

11. A vehicle door assembly comprising:
   a handle chassis;
   a window pane; and
   a multi-function bracket including,
      an elongated guide member defining a slot configured to guide the window pane,
      a handle-chassis bracket extending from the elongated guide member,
      a slider including a first portion and a second portion wherein the first portion is coupled to the handle-chassis bracket and the second portion defines a mounting aperture configured to receive the handle chassis and including a projection extending into the aperture, wherein the projection includes a first portion extending in a first direction and a second portion extending in a second direction, different than the first direction, and
      a compressible member coupled to the first portion of the slider and having a compressed state and an uncompressed state, wherein the slider is configured to translate towards the handle chassis bracket when the compressible member changes from the uncompressed state to the compressed state, and wherein the handle chassis is configured to move from a first side of the projection to a second side of the projection towards the handle chassis bracket.

12. The vehicle door assembly of claim 11, wherein the compressible member includes an upper portion and a lower portion, wherein either the upper portion or the lower portion is configured to rotate towards the handle chassis bracket when the compressible member changes from the uncompressed state to the compressed state.

13. The vehicle door assembly of claim 11, wherein the multi-function bracket includes a U-shaped protrusion outwardly extending from the handle-chassis bracket.

14. The vehicle door assembly of claim 13, wherein the compressible member defines a U-shaped aperture configured to receive the U-shaped protrusion.

15. The vehicle door assembly of claim 14, wherein the first portion of the slider defines an aperture configured to receive the U-shaped protrusion.

* * * * *